United States Patent [19]

Craig, III

[11] Patent Number: 4,742,873
[45] Date of Patent: May 10, 1988

[54] SUBTERRANEAN FLOOD TRACER PROCESS

[75] Inventor: Forrest F. Craig, III, Spring, Tex.

[73] Assignee: Mitchell Energy Corporation, The Woodlands, Tex.

[21] Appl. No.: 24,768

[22] Filed: Mar. 11, 1987

Related U.S. Application Data

[63] Continuation of Ser. No. 731,441, May 6, 1985, abandoned.

[51] Int. Cl.$^4$ ............................................. E21B 47/10
[52] U.S. Cl. ..................................... 166/252; 73/155
[58] Field of Search .................. 166/250, 252; 436/27, 436/56; 73/40.7, 155

[56] References Cited

U.S. PATENT DOCUMENTS

| | | | |
|---|---|---|---|
| 2,318,689 | 5/1943 | Hodell et al. | 166/252 |
| 2,578,500 | 12/1951 | Bernard et al. | 436/27 |
| 2,769,913 | 11/1956 | Mazzagatti | 166/252 |
| 3,435,672 | 4/1959 | Brink et al. | 436/27 |
| 3,623,842 | 9/1971 | Deans | 436/27 |
| 3,847,548 | 9/1974 | Keller et al. | 436/27 |
| 3,993,131 | 11/1976 | Riedel | 166/252 |
| 4,099,565 | 7/1978 | Sheely, Jr. et al. | 166/252 |
| 4,168,746 | 9/1979 | Sheely | 166/252 |
| 4,303,411 | 12/1981 | Chen et al. | 436/27 |
| 4,501,324 | 2/1985 | Sandiford et al. | 166/252 |
| 4,551,154 | 11/1985 | Malcosky et al. | 436/56 |

OTHER PUBLICATIONS

Reeves, Booth, "A Case History of a $CO_2$ Pilot Project", 11/21/84.
Trautman, Milton & Schutz, Donald F., "Field Applications of Radioactive Tracers in Secondary Recovery", Jun. 1970.
Valleroy, Willmann, Campbell and Powers, "Deerfield Pilot Test of Recovery by Steam Drive", Jul. 1967.
Vetter, O. J., "The Chemical Squeeze Process—Some New Information on Some Old Misconceptions", Mar. 1973.
Tinker, G., "Gas Injection with Radioactive Tracer to Determine Reservoir Continuity—East Coalinga Field, Cal.", Nov. 1973.
Kelldorf, W. F. N., "Radioactive Tracer Surveying—A Comprehensive Report", Jun. 1970.
Calhoun, II & Hurford, "Case History of Radioactive Tracers and Techniques in Fairway Field", Oct. 1970.
McLeod, Rhodes and Day, "Radiotracers in Gas-Liquid Transportation Problems—A Field Case", Aug. 1971.
Gore & Terry, "Radioactive Tracer Techniques", Sep. 1956.
Ford, Walter O., "Some Case Histories of Remedial Work Resulting from Water Tracer Surveys", Jul. 1966.
Greenkorn, Robert A., "Experimental Study of Waterflood Tracers", Jan. 1962.
Edwards & Holter, "Applications of a Subsurface Solid-State Isotope Injector to Nuclear-Tracer Survey Methods", Feb. 1962.
Pottier, J., "Further Notes on Soviet Production Research—Radioactive Tracers, Water Invasion, Electric Analyzers", Jul. 1963.
Gore, Georg L., "Relative Injectivity Profiles of Irregular Size Holes", Sep. 1963.
Goddard, R. R., "Fluid Dispersion and Distribution in Porous Media Using the Frequency Response Method with a Radioactive Tracer", Jun. 1966.
Watkins & Mardock, "Use of Radioactive Iodine as a Tracer in Water-Flooding Operations", Feb. 1954.
Kohl, Newacheck and Anderson, "Locating Casing Shoe Leaks with Radioactive Argon", Nov. 1955.
Flagg, Myers, Campbell, Terry and Mardock, "Radioactive Tracers in Oil Production Problems", Oct. 1955.
Brigham, W. E., "Analysis of Well-to-Well Tracer Flow to Determine Reservoir Layering", Oct. 1984.
Tomich, Dalton, Jr., Deans and Shallenberger, "Single-Well Tracer Method to Measure Residual Oil Saturation", Feb. 1973.
Baldwin, D. E., Jr., "Prediction of Tracer Performance in a Five-Spot Pattern", Apr. 1966.
Jones, Lynn D., "Analytical and Interpretive Problems of Production Logging", Aug. 1967.
Wagner, O. R., "The Use of Tracers in Diagnosing Interwell Reservoir Heterogeneities—Field Results", Nov. 1977.
Widmyer, Frazier, Strange, Talash, "Low-Tension Waterflood at Salem Unit-Postpilot Evaluation", Sep. 1979.
McAuliffe, Clayton D., "Crude-Oil-in-Water Emulsions to Improve Fluid Flow in an Oil Reservoir", Jun. 1973.
Sheely, Clyde Q., "Description of Field Tests to Determine Residual Oil Saturation by Single-Well Tracer Method", Feb. 1978.
Horne, Roland, "Geothermal Reinjection Experience in Japan", Mar. 1982.
Sheely & Baldwin, "Single-Well Tracer Tests for Evaluating Chemical Enhanced Oil Recovery Processes", Aug. 1982.
Tester, Bivins and Potter, "Interwell Tracer Analyses of a Hydraulically Fractured Grantic Geothermal Reservoir", Aug. 1982.
Evans, Parsons and Wallace, "Nuclear Grout Monitoring on Offshore Platforms", Mar. 1981.
Hooge, Sheely and Williams, "Interwell-Tracers—An Effective Reservoir Evaluation Tool": West Sumatra Field Results", May, 1981.
Young, Larry C., "A Finite-Element Method for Reservoir Simulation", Feb. 1981.
Tyssee & Vetter, "Chemical Characterization Problems of Water-Soluble Polymers", Dec. 1981.

*Primary Examiner*—Stephen J. Novosad
*Assistant Examiner*—Bruce M. Kisliuk
*Attorney, Agent, or Firm*—Gunn, Lee & Jackson

[57] ABSTRACT

A method for determining the injection source of an injection fluid which will break through at the production wells of a subterranean flooding project is disclosed in the preferred embodiment. The source of the injection fluid is determined by injecting halocarbon tracer compounds into the fluid stream injected into the subterranean formation. The tracer compounds of the injection are identified by gas chromatography/electron capture detection analysis.

10 Claims, No Drawings

SUBTERRANEAN FLOOD TRACER PROCESS

This is a continuation of application Ser. No. 731,441 filed May 6, 1985, now abandoned.

BACKGROUND OF THE DISCLOSURE

This invention is directed to a method for determining the injection source of a fluid flowing through a subterranean formation, particularly, the injection source of carbon dioxide in a carbon dioxide gas drive flooding project.

During the recovery of petroleum from subterranean formations, it is often necessary to inject a fluid into the subterranean formation to force the recoverable petroleum toward a producing well. Water flooding is a widely practiced example of a recovery process which is well known in the prior art. Other flooding processes such as steam flood, gas drive flood, carbon dioxide flood, and the like to enhance recovery of petroleum from subterranean formations are also known and practiced throughout the world.

Much effort and expense has been expended in developing and demonstrating the effectiveness of various subterranean formation flooding processes. Determining the flow patterns of the subterranean formation is very important to the success of a flooding project. As a consequence, tracers are injected into the formation for this purpose. The use of tracer materials for determining the fluid flow patterns of a subterranean formation is not new. Numerous materials are disclosed in U.S. Pat. No. 3,993,131 to Riedel which have been tried as tracers. The tracers include various dyes, gases such as helium and carbon dioxide, acids or the salts thereof, boron, bromide, chromate, dichromate, iodide, nitrate or thiocyanate ions, formaldehyde, carbon disulfide, and radioactive materials such as tritiated water (HTO), tritiated hydrogen (HT), tritiated methane, and krypton-85.

The use of these tracers has met with varying degrees of success and acceptability in the industry. The tremendous amount of activity and experimentation with different types of tracers is indicative of the great need that has existed for a relatively inexpensive and effective method of field evaluation of flooding processes in specific subterranean formations. Every formation has unique characteristics, therefore a need exists for an effective tracer process for determining flow patterns in the formation. One problem associated with the development of an effective tracer process is the appearance of an injected fluid at a producing well at a time other than that predicted. This is generally referred to as the breakthrough of injected fluid. Since a number of injection wells are usually spaced about the producing well, it is essential to determine the source of the injected fluid which will breakthrough at the production well. By identifying the source of the injected fluid, a determination of the flow characteristics of the subterranean formation between the injection and production wells can be made. For example, a quick breakthrough may be indicative of a higher than anticipated formation permeability or a fissure in the formation. Likewise, a breakthrough later than anticipated may be indicative of a lower than anticipated formation permeability or the presence of an obstruction in the formation. By identifying the source of the injected fluid, the flow characteristics of the formation about the production well can be mapped and adjustments made in the formation flooding process to maximize the recovery of petroleum from the formation.

An effective tracer material must flow with the flood front of the injected fluid and must be inert to the formation materials. By inert is meant that the tracer must not get adsorbed onto the rocks of the formation; it must not partition into the hydrocarbon or water phase; and it must not interact with the organics and minerals present in the formation. A tracer should also be safe to handle and reasonable in cost. The tracer must also behave in the formation as the fluid which is being traced and it must be detectable in the produced fluid, even in minute quantities.

Generally, the tracer systems available at the present time employ a slug injection technique. That is, a slug of the tracer material is injected into the formation followed by injection of the motive fluid. This is typical for injection of radioactive tracers. The high cost and safety hazards of some tracers prohibit periodic or continuous injection of the tracer in the motive fluid stream. For example, radioactive tracers are very expensive and require special handling by licensed personnel. The tracers used in the method of the present invention are relatively inexpensive, safe to use, and detectable and measurable at concentrations far lower than previously employed chemical tracers. The tracers utilized in the present invention may also be continuously injected in the motive fluid stream providing additional data indicative of the sweep efficiency of the flooding project.

BRIEF SUMMARY OF THE DISCLOSURE

The present disclosure is directed to a method for tracing the flow of fluid injected in a subterranean formation. Specifically, the present disclosure is directed to a method for tracing the flow of carbon dioxide through a formation subjected to a carbon dioxide flood recovery process. The tracers utilized in the method of the disclosed preferred embodiment of the invention are sulfur hexafluoride, Freon-11, Freon-12, and Freon-113. Different tracers are injected at various injection wells and flow through the subterranean formation and are recovered at the producing well.

DETAILED DESCRIPTION OF THE PREFERRED EMBODIMENT

The method of this invention is useful to determine flow patterns in any subterranean formation; however, for illustrative purposes, the examples set forth hereinafter illustrate tracing the flow of carbon dioxide through a formation subjected to a carbon dioxide flood recovery process. The method is carried out in a subterranean formation that is penetrated by injection and production wells extending from the surface of the earth into the formation. Generally, a five well pattern system is used. This generally comprises four injection wells spaced about a production well located at approximately the center of the area circumscribed by the injection wells. Fewer or a greater number of injection wells may be utilized and can be arranged in any desired pattern. The typical pattern, however, includes five wells comprising a central production well and four injection wells spaced radially about the production well.

In carrying out the invention of the preferred embodiment, carbon dioxide is the motive fluid injected into the formation at a predetermined depth through the spaced injection wells. However, the process of this disclosure is not limited to injection solely of carbon dioxide. Other motive fluids may be utilized as desired for a particular formation; for example, water, methane, nitrogen, and liquified petroleum (LPG or the like). The casing of the injection wells may require perforation at the selected depth if it has not been previously perforated. Injection of the carbon dioxide into the formation is via the perforations through the casing of the injection well. Surface equipment such as pumps and compressors operatively connect the carbon dioxide source to the well head of the injection wells in a well known manner. A tracing compound selected from a group of halocarbon tracers is injected into the carbon dioxide stream and carried into the subterranean formation. A different tracing compound may be injected at each injection well. Injection of the tracer compound into the formation is continuous; continuous injection of the tracer being defined to include injection of a specified concentration of the tracer on a predetermined cycle, as for example, once a day or once a week. Continuous injection of the tracer compounds is preferred; however, the tracer compounds of the present disclosure may also be utilized in a spike or single injection method.

Injection of the tracer compound of the invention is continuous and therefore very small quantities of the tracer compound are injected. In general, minimum detectable concentrations of the tracer compound can range between about 0.5 parts per billion (ppb) and about 30 parts per billion (ppb). Preferred concentrations of the tracers injected in the motive fluid stream are between about 200 ppb and 4,000 ppb. The tracer is detected at the producing well by sampling the produced or collected fluid and analyzing the sample using a gas chromatography/electron capture detection system.

The tracer compounds of the present disclosure are selected from a group comprising halocarbon compounds and sulfur hexafluoride. Halocarbons are defined as a compound containing carbon, and one or more halogens (fluorine, chlorine, bromine, iodine and astatine), and sometimes hydrogen. While a number of halocarbons may be suitable for use as tracer compounds, it has been found that Freon-11, Freon-12 and Freon-113 include characteristics which are particularly desirable for the process of the present disclosure. Those tracer compounds tested as set forth in the examples below, exhibited all the desirable characteristics of an effective tracer, i.e. they flowed with the motive fluid, were inert to the formation material, did not partition into the hydrocarbon or water phase, and did not interact with the organics and minerals present in the oil bearing formation.

The feasibility of the method of this invention is demonstrated in the following examples. These examples are provided solely for the purpose of enhancing understanding of the method described herein. These examples are exemplary only and do not function as limitations for the invention described and claimed. Laboratory fluid tests were performed using field fluids in coiled tubing packed with sand. The test results indicate that the tracers did flow with the motive fluid flood front and were detected at the breakthrough of the motive fluid at the production well. The tracers, therefore, behaved in the formation in the same manner as did the motive fluid.

EXAMPLE 1

A coiled tubing 0.245 inch in internal diameter and 48 feet in length was packed with 120–200 mesh glass beads, and flushed with reservoir fluids to simulate reservoir conditions prior to commencing the carbon dioxide flood recovery process. A 90 mol.% $CO_2$ sales gas mixture and 10 mol.% propane gas at 2,200 psig and 154° F. was then pumped through the coil tubing. A 38 ppb Freon-12 solution was pumped into the coiled tubing at 15 milliliters per hour with the $CO_2$/propane gas mixture. The effluent was collected periodically at the production well and analyzed by the gas chromatography/electron capture and detection technique. The results are summarized in Table 1 and based on the material balance, within experimental error, the tracer was not absorbed by the sand, nor did it partition into the oil phase.

TABLE 1

Recombined Reservoir Fluid Displaced by 90 mol. % $CO_2$ - Sales Gas Mixture and 10 mol. % Propane Gas at 2200 psig and 154° F. F-12 tracer-38PPB

| Cumulative Gas Injection Frac. Pore Volume | ΔP Across Tube PSI | Tracer Concentration |
|---|---|---|
| 0.0904 | 12 | 0 |
| 0.1807 | 9 | 0 |
| 0.2711 | 8 | 0 |
| 0.3615 | 8 | 0 |
| 0.4519 | 7 | 0 |
| 0.5422 | 7 | 0 |
| 0.6326 | 3 | 0 |
| 0.7230 | 3 | 0 |
| 0.8133 | 2 | 0 |
| 0.9037 | 2 | 0 |
| (0.9625) Breakthrough | — | 0 |
| 0.9941 | 1 | 23 |

EXAMPLE 2

The same experiment was performed as described in Example 1, except that a solution of 5.5 ppb of Freon-113 was injected with the carbon dioxide/propane gas stream through the coiled tubing packed with sand. The results are summarized in Table 2. Based on these results and within experimental error, it is concluded that this tracer likewise is not lost by partition into the oil phase, nor it is lost by adsorption onto the packing material in the coiled tubing or interaction with the organics or minerals present in the sand.

TABLE 2

Recombined Reservoir Fluid Displaced by 90 mol. % $CO_2$ - Sales Gas Mixture and 10 mol. % Propane at 2200 psig and 154° F. F-113 tracer-5.5PPB

| Cumulative Gas Injection Frac. Pore Volume | ΔP Across Tube PSI | Tracer Concentration |
|---|---|---|
| 0.0904 | 9 | 0 |
| 0.1807 | 9 | 0 |
| 0.2711 | 8 | 0 |
| 0.3615 | 8 | 0 |
| 0.4519 | 7 | 0 |
| 0.5422 | 4 | 0 |
| 0.6326 | 4 | 0 |
| 0.7230 | 2 | 0 |
| 0.8133 | 2 | 0 |
| 0.9037 | 1 | 1 |
| (0.9625) Breakthrough | — | |

TABLE 2-continued
Recombined Reservoir Fluid
Displaced by 90 mol. % $CO_2$ - Sales Gas
Mixture and 10 mol. % Propane at 2200
psig and 154° F. F-113 tracer-5.5PPB

| Cumulative Gas Injection Frac. Pore Volume | ΔP Across Tube PSI | Tracer Concentration |
| --- | --- | --- |
| 0.9941 | 1 | 1.6 |
| 1.0840 | 1 | 5.5 |

EXAMPLE 3

The same experiment was performed as described as in Examples 1 and 2 except that the tracer solution contained two tracers of different concentrations. The tracer solution included 423 ppb of Freon-12, and 8 ppb of Freon-113, which solution was injected with the carbon dioxide/propane gas stream through the coiled tubing packed with sand. The results are summarized in Table 3. As in the prior examples, the tracers were detected at the approximate breakthrough of the carbon dioxide. Also, based on these results and within experimental error, it is concluded that these tracers were not lost by partition into the oil phase, nor were they lost by adsorption onto the tubing packing material or interaction with the organics or minerals present in the sand.

TABLE 3
Recombined Reservoir Fluid
Displaced by 90 mol. % $CO_2$ - Sales Gas
Mixture and 10 mol. % Propane at 2200
psig and 154° F. F-12 tracer-423PPB F-113 tracer-8PPB

| Cumulative Gas Injection Frac. Pore Volume | ΔP Across Tube PSI | Tracer Conc. (F-12) PPB | Tracer Conc. (F-113) PPB |
| --- | --- | --- | --- |
| 0.1120 | 17 | 0 | 0 |
| 0.2240 | 17 | 0 | 0 |
| 0.3360 | 13 | 0 | 0 |
| 0.4480 | 13 | 0 | 0 |
| 0.5600 | 12 | 0 | 0 |
| 0.6720 | 10 | 0 | 0 |
| 0.7841 | 9 | 0 | 0 |
| 0.8961 | 6 | 0 | 0 |
| 0.9437 | — | 3.7 | 1.92 |
| (0.9849) Breakthrough | — | — | — |
| 1.0060 | — | 142 | 6.00 |
| 1.0081 | 2 | — | — |
| 1.0581 | — | 420 | 7.32 |
| 1.1201 | 2 | — | — |
| 1.2321 | 2 | — | — |

These examples demonstrate that a small amount of tracer, in the parts per billion range, is detectable and flows through the formation with the carbon dioxide flood front, making the process of the invention more economical than the prior art methods. These experiments also demonstrates that more than one tracer may be used and simultaneously detected in the effluent at the production well. This is very useful in a flooding project because it permits the use of different tracers at the injection wells so that the source of the motive fluid breakthrough can be quickly determined. This is particularly useful to the operator of the flooding project because it permits identification of the injection well which may be shut down once the motive fluid injected from that well breaks through at the producing well. Continued injection of motive fluid at the breakthrough well would not appreciably increase the recovery of petroleum from the quadrant of the subterranean formation flooded by the breakthrough injection well, and therefore considerable expense can be saved by shutting down the injection well.

In addition, these examples demonstrate that the tracers flow through the formation with the carbon dioxide motive fluid and behave in the formation as does the carbon dioxide. This characteristic of the tracers of the invention is evidenced by the experimental data which show that both the tracers and the carbon dioxide are simultaneously detectable at the production well at breakthrough. By continuously injecting the tracers and recording the elapsed time that the injected tracers are detected at the production well, the sweep efficiency through the formation of the flooding project can be determined. This information is very helpful in evaluating the effectiveness of the flooding project.

While the foregoing is directed to the preferred embodiment of the present invention, other and further embodiments of the invention may be devised without departing from the basic scope thereof, and the scope thereof is determined by the claims which follow.

I claim:

1. The method for determining the injection source of carbon dioxide breakthrough at a production well in a subterranean formation penetrated by the production well and at least two injection wells spaced radially about the production well, which comprises:
   (a) injecting a carbon dioxide gas mixture into the formation through said injection wells;
   (b) injecting a trace quantity of a tracer compound into the formation with said carbon dioxide gas mixture, a different tracer compound being injected in each of said injection wells, wherein the concentration of said tracer compound in said carbon dioxide gas mixture is in the range of 0.5 to 40 parts per billion;
   (c) removing an effluent sample periodically from the formation at said production well; and
   (d) analyzing said sample to detect the presence of said tracer compound for determining the injection source of said carbon dioxide recovered in said sample.

2. The method of claim 1 wherein said tracer compound is a halocarbon.

3. The method of claim 1 wherein said tracer compound is Freon-11.

4. The method of claim 1 wherein said tracer compound is Freon-12.

5. The method of claim 1 wherein said tracer compound is Freon-113.

6. The method of claim 1 wherein said tracer compound is sulfur hexafluoride.

7. The method of claim 1 wherein said tracer compound is a mixture of at least two tracers selected from a group of tracers consisting of sulfer hexafluoride, Freon-11, Freon-12, and Freon-113.

8. The method for determining the injection source of motive fluid breakthrough at a production well in a subterranean formation penetrated by the production well and at least two injection wells spaced radially about the production well, which comprises:
   (a) injecting a motive fluid into the formation through said injection wells;
   (b) injecting a trace quantity of a tracer compound into the formation with said motive fluid, a different tracer compound being injecting through each of said injection wells and said tracer compound being selected from a group of tracers consisting of sulfur hexafluoride, Freon-11, Freon-12, and Freon-113, wherein the concentration of said tracer compound in said motive fluid is in the range of 0.5 to 4000 parts per billion;

(c) removing an effluent sample periodically from the formation at said production well; and (d) analyzing said sample to detect the pressure of said tracer compound for determining the injection source of said motive fluid recovered in said sample.

9. The method of claim 8 wherein said tracer compound is continuously injected into the formation with said motive fluid.

10. The method of claim 8 wherein a single injection of said tracer compound is injected into the formation with said motive fluid.

* * * * *